(12) United States Patent
Holland (10) Patent No.: US 7,723,660 B2
(45) Date of Patent: May 25, 2010

(54) SENSOR-BASED CHEMICAL MANAGEMENT FOR AGRICULTURAL LANDSCAPES

(76) Inventor: Kyle Holland, 5011 S. 73rd St., Lincoln, NE (US) 68516

( * ) Notice: Subject to any disclaimer, the term of this patent is extended or adjusted under 35 U.S.C. 154(b) by 0 days.

(21) Appl. No.: 12/167,706

(22) Filed: Jul. 3, 2008

(65) Prior Publication Data

US 2009/0007485 A1   Jan. 8, 2009

Related U.S. Application Data (60) Provisional application No. 60/958,330, filed on Jul. 3, 2007.

(51) Int. Cl.
G01C 21/02 (2006.01)
G01C 21/24 (2006.01)

(52) U.S. Cl. .................. 250/206.1; 382/110; 702/2; 702/5

(58) Field of Classification Search .............. 250/206.1; 382/110; 702/2, 5
See application file for complete search history.

(56) References Cited

U.S. PATENT DOCUMENTS

| | | | |
|---|---|---|---|
| 3,443,072 A | 5/1969 | Gibbs | |
| 3,910,701 A | 10/1975 | Hendersen et al. | |
| 4,055,768 A | 10/1977 | Bromberg | |
| 4,369,886 A | 1/1983 | Lane et al. | |
| 4,518,253 A | 5/1985 | Takahashi | |
| 4,628,454 A | 12/1986 | Ito | |
| 4,926,170 A | 5/1990 | Beggs et al. | |
| 4,986,665 A | 1/1991 | Yamanishi et al. | |
| 5,025,150 A | 6/1991 | Oldham et al. | |
| 5,144,767 A | 9/1992 | McCloy et al. | |
| 5,296,702 A | 3/1994 | Beck et al. | |
| 5,389,781 A | 2/1995 | Beck | |
| 5,585,626 A | 12/1996 | Beck et al. | |
| 5,763,873 A | 6/1998 | Beck et al. | |
| 5,789,741 A | 8/1998 | Kinter | |
| 5,809,440 A | 9/1998 | Beck et al. | |
| 5,833,144 A | 11/1998 | Kinter | |
| 5,837,997 A | 11/1998 | Beck | |
| 6,160,902 A | 12/2000 | Dickson et al. | |
| 6,393,927 B1 | 5/2002 | Biggs | |
| 6,596,996 B1 | 7/2003 | Stone et al. | |
| 6,963,881 B2 * | 11/2005 | Pickett et al. ............ 707/104.1 |
| 6,999,877 B1 * | 2/2006 | Dyer et al. ..................... 702/5 |
| 7,047,133 B1 * | 5/2006 | Dyer et al. ..................... 702/5 |
| 2001/0036295 A1 * | 11/2001 | Hendrickson et al. ....... 382/110 |
| 2004/0119020 A1 | 6/2004 | Bodkin | |

OTHER PUBLICATIONS

Industrial Control Applications, Mar. 1991. Infrared sensing and data transmission fundamentals. Motorola. DL412/D, AN1016, pp. 367-372.

(Continued)

*Primary Examiner*—Seung C Sohn
(74) *Attorney, Agent, or Firm*—McKee, Voorhees & Sease, P.L.C.

(57) ABSTRACT

An algorithmic method is described for sensor-based real-time application of an agricultural material. Method includes means for characterizing and treating crop biomass variability without the use of a grower managed reference crop. Crop variability is determined statistically by driving one or more transects through the field in order to collect crop canopy information for sensor calibration purposes.

9 Claims, 5 Drawing Sheets

OTHER PUBLICATIONS

Linear and Interface Integrated Circuits. 1988. MC3373 Datasheet. Motorola. pp. 9-43 to 9-46.

Applications Handbook. 1994. OPT201 Photodiode amplifier rejects ambient light. Burr-Brown. AB-061, p. 379.

Gage, S. Evans, D., Hodapp, M. and Sorensen, H. 1977 Optoelectronics Applications Manual. McGraw-Hill Book Company.

Seeing the Light of Nitrogen. Mid-Feb. 1996. Nebraska Farmer. pp. 14, 15 and 20.

Tools with Eyes. Mid-Mar. 1989. Farm Journal. pp. 16-18.

McCabe, D., "An eye on nitrogen", Precision Ag, Mar. 2004, pp. 21-23.

Stafford, J.V. et al. 1989. A portable infrared moisture meter for agricultural and food materials: Part 1, Instrument development. J. Agric. Eng. Res. vol. 43, pp. 45-56.

Palmer, J. et al. 1971. Automatic control of sugar beet singling and thinning by means of an on-line digital computer. J. Agric. Eng. Res. vol. 16 (2) pp. 107-125.

Searcy, S.W. et al 1990. Measurement of agricultural field location using microwave frequency triangulation. Computers and Electronics in Agriculture. vol. 4, pp. 209-233.

Knipling, E.B., "Physical and physiological basis for the of visible and near-infrared radiation from vegetation", 1970 American Elsevier Publishing Company, Inc. p. 155-159.

Thompson, J.F. et al. 1991. Potential for automatic weed detection and selective herbicide application. Crop Protection. vol. 10 Aug. 1991, p. 254-259.

Ritchie, J.C. et al. 1992. Airborne laser measurements of rangeland canopy cover and distribution. J. Range Mange. 45:189-193.

Aronson. M.H. 1977 Low-level Measurements-8 Lock-in and carrier amplifiers. Measurements and Data Corporation. pp. C1-C15.

Haggar, R.J., Stent, C.J., and Rose, J. "measuring spectral differences in vegetation canopies by a reflectance ratio meter", Weed Research, vol. 24, pp. 59-65.

Haggar, R.J. Stent, C.J., and Issac S., "A Prototype hand-held patch sprayer forkilling weeds, activated by spectral difference in crop/weed canopies", Agricultural Research Council, Nov. 15, 1982, pp. 349-358.

Hooper, M.W., Harries, G.O. & Ambler B., "A photoelectric sensor for distinguishing between plant material and soil", J. argic. Engng. Res. 1976, 21, pp. 145-155.

* cited by examiner

SENSOR-BASED CHEMICAL MANAGEMENT FOR AGRICULTURAL LANDSCAPES

This application claims priority to U.S. Patent Application Ser. No. 60/958,330, filed Jul. 3, 2007.

BACKGROUND OF THE INVENTION

1. Field of the Invention

This invention relates generally to crop canopy light sensors and, more specifically, to an algorithm and method for the real-time application of agrochemicals utilizing active crop-canopy light sensors.

2. Background of the Art

The term "precision farming" is often used to describe the management of spatial variability in soil and crop conditions within a field. Other terms, "site specific farming", "prescription farming", and "variable rate application (VRA) technology" are sometimes used synonymously with precision farming to describe the tailoring of soil and crop management to the conditions at various locations throughout a field. Typical precision farming techniques include: varying the planting density of individual plants based on the ability of the soil to support growth of the plants; and the selective application of farming products such as herbicides, insecticides, and, of particular interest, fertilizer. Precision farming techniques utilizing, for example, Global Positioning System (GPS) technology has found many uses, one being the application of fertilizers in agricultural fields, as is described, for example, in U.S. Pat. No. 5,220,876 to Monson et al. The '876 patent describes a variable-rate fertilizer application system. The system has a digital map characterizing the field's soil types. The system also has other maps that characterize the desired level of various fertilizer types to be applied upon the field. The patent states that the levels of fertilizer can be determined from predefined characteristics, such as existing fertilizer levels, field topography or drainage studies. A processor calculates and controls the dispensing of the various fertilizers based on both the soil map and the fertilizer map. A position locator on the vehicle dispensing the fertilizers provides the necessary location information to apply the prescribed amount of fertilizer in the correct location. Related U.S. Pat. No. 5,355,815 to Monson describes a closed-loop fertilizer application system, which also varies the application rate, but which does not require maps of current fertilizer levels. The system is said to be able to determine a chemical prescription in real-time for a soil scene, depending on the existing soil fertilizer content ascertained by a real-time soil analyzer.

Another variable-rate fertilizer application system is described in U.S. Pat. No. 4,630,773 to Ortlip. The '773 patent describes a system that applies fertilizer according to the specific needs of each individual soil type of soil comprising a field. The patent also describes the assembly of a digital soil map for a field to be fertilized. An aerial infrared photograph of the field is taken. The patent states that the different shades in the photograph correspond to different moisture contents of the soil types. The photograph is digitized into an array of pixels. Each pixel is assigned a digital value based on the shading in the photograph, such that the value is representative of the soil type the pixel represents. The application of fertilizer is varied according to the digital soil map.

U.S. patent application Ser. No. 11/085,589 and U.S. Pat. Nos. 6,889,620 and 7,171,912 utilize maps of site-specific amounts of a soil nutrient, to be applied in fertilizer to an agricultural field is created using a map of site-specific amounts of the soil nutrient needed to produce the maximum possible yield at the particular site. The nutrient amounts may be added to the soil using the map and conventional variable-rate fertilizer application methods. In one embodiment, the amounts of the soil nutrient needed to produce the maximum possible yield at each site is created using a map of site-specific measures of biomass produced by the field in a past growing season or seasons, which in turn is created from a remotely sensed biomass image.

U.S. Pat. No. 6,393,927 discloses a method and apparatus for the real time determination and application of optimum amounts of nitrogen fertilizer to corn and other arable crops such as cotton, sugar beats, wheat, etc. by the use of rapid, non-destructive sensors and various fertilizer application methods. In a first embodiment, optical reflectance measurements of the crop canopy and a reference strip at the fertilizer response plateau are taken by sensors carried by a center pivot irrigation system. A second embodiment of the invention utilizes a tractor drawn fertilizer applicator with the sensors mounted on the application booms. This second embodiment may also utilize the Global Positioning System to provide tractor position for storage along with crop data for later use and comparison.

U.S. Pat. Nos. 6,601,341, 6,880,291 and 7,188,450 disclose methods for in-season macro and micronutrient application based on predicted yield potential and a nutrient response index. U.S. Pat. Nos. 6,601,341 and 6,880,291 disclose methods that include the steps of: determining a nutrient response index for a field; determining the normalized difference vegetation index (NDVI) of an area to fertilize; determining a predicted crop yield for the area; determining an attainable crop yield for the area; determining the nutrient requirement for the area as the difference between the nutrient removal at the attainable yield minus the nutrient removal at the predicted yield, adjusted by the efficiency of nutrient uptake in the particular crop. Whereas the U.S. Pat. No. 7,188,450 method includes the steps of: determining a nutrient response index for a field; determining the NDVI of an area to fertilize; determining the coefficient of variation of NDVI over a plot; determining a predicted crop yield for the area without additional nutrient; determining an attainable crop yield for the area with additional nutrient; determining the nutrient requirement for the area as the difference between the nutrient removal at the attainable yield minus the nutrient removal at the predicted yield, adjusted by the efficiency of nutrient utilization in the particular crop as indicated by the coefficient of variation. Like the '927 patent, both methods rely on a producer-created adequately fertilized reference area in order to calibrate the sensing system to field growing conditions.

Figure 1:
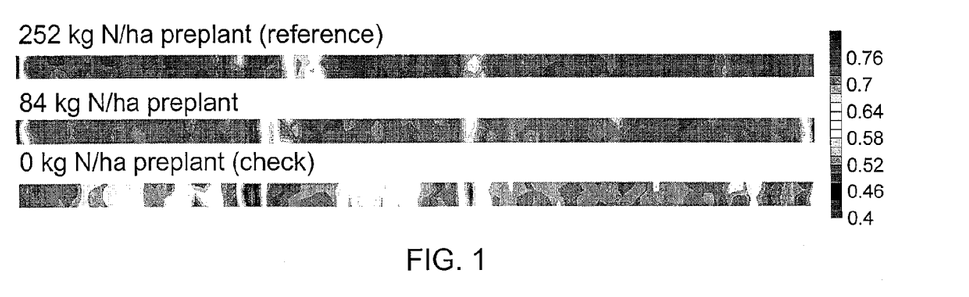
FIG. 1 is a representation of amber NDVI values from active crop canopy sensor on at V10 growth stage for three adjacent 12-row corn strips receiving 0, 84, or 252 kg N/ha shortly before planting.

There are many problems associated with utilizing a high N reference strip or region as an in-season calibration standard for calibrating real-time remote sensors. The reference concept assumes that a section of the field (usually a strip) can be over fertilized so as to create a region in the field that is non nutrient limited. The region can then be compared to the remainder of the field in order to determine the site specific nutrient needs for the entire field. It is assumed that if a non treated portion of the field compares in biomass and/or color (dark green) to the reference strip, then it has its nutrient requirements met and subsequently will receive less nutrient via variable rate application. Whereas, portions of the field that have lower biomass and/or lighter color (pale green) in comparison to the reference strip receive higher amounts of nutrient. If fields had uniform soil, drainage, micronutrients, organic matter, etc. . . . the reference strip concept would be and exceptional solution for in-season, real-time variable rate applicator calibration. Herein lays the primary problem: crops grown within a reference strip in the real world can not be an absolute reference for comparison to crops grown in other locations in the field. This is due to crop growth variability resulting from variable soil types throughout the field. Variations in organic matter, micronutrients and drainage impact how the crop will grow. Even within the reference strip, wide variations in crop status can be measured as the reference strip transverses the various soil types and conditions across the field, see FIG. 1. Here, notice the spatial variability apparent in each of the three preplant N rates, especially notice the variations in the 252 kg/ha reference strip rate. As such, data collected from the reference strip crops can result in a dubious standard for comparison against crops grown in other regions of the field. Varying levels of organic matter and resulting mineralization can give a false indicator as to plant's future nutrient requirements, that is, a plant can appear to have adequate nutrient resources when compared to the reference plants. In reality, available soil nutrient may be on the verge of running out and subsequently these plants would be deprived of required nutrients as the plant accumulates biomass later in the growing season.

Another problem related to the use of the reference strip concept pertains primarily to adoption by the end user. Cultural practice barriers are difficult to over come. Many growers do not want the added steps and cost of preparing and managing a nutrient rich reference region in their fields. A University of Nebraska extension publication actually recommends not just one reference strip per field but rather several. Furthermore, many large growers may have up to a dozen fields to manage each with multiple reference strips. Sprayer service companies may have dozens of fields to manage for their clients. In addition to establishing a reference strip in a particular field, care has to be exercised as to where the reference strip is positioned within a field from year-to-year. Reference strip management is not a management process that is desirable for growers to adopt. Conceptually, the use of a reference strip or region appears to be a novel method to calibrate remote sensing instrumentation, however, when one considers management overhead involved, the appeal of the technique quickly fades as the management and logistical realities become clear.

In the following, we will disclose an alternative method that uses real-time active crop sensors for variable rate control of agrochemicals. The method to be presented differs from previous VRA systems in that it does not require the use of a managed crop reference strip or region in a field to calibrate the system and it does not rely on preprocessed geospatial, yield or biomass data in order to make agrochemical rate prescriptions.

SUMMARY OF THE INVENTION

The present invention provides several methods for practicing sensor-based precision farming techniques pertaining to the application of materials such as seeds, fertilizer, pesticides, herbicides or other agricultural substances. In contrast to prior techniques, the preferred embodiment does not utilize a highly fertilized reference area (or controlled agrochemical region whether it be treated with a high or low dose of material) to calibrate the sensing system for application of an agrochemical and thereby eliminates the extra management steps and overhead required by the producer to create, locate and maintain these portions of a field. This is advantageous because a major hurdle hindering the adoption of remote sensing technology for variable rate agrochemical application pertains to the requirement of creating a known calibration standard within the field in order to differentially compare measurements obtained for the control section to other non control portions of the field. Growers and spray service providers alike view this method of use limiting since it places extra demands on their operations by requiring intensive management of these control or in-field reference plots/strips. The methods disclosed hereafter teaches a non-reference strip approach to variable-rate agrochemical application that utilizes a random walk through the field, or rather, one or more transects through the field in order to measure crop growth variability resulting from various soil types, drainage, cropping history, mineralization, etc. . . . Information collected by the measurement instrumentation is then utilized to determine a normalized biomass response function for the entire field. This function can then be utilized in conjunction with a grower's conventional cultural practice to optimize application of an agrochemical. Additionally, the methodologies disclosed hereafter are not limited to real-time active sensors but may also be applied to other remote sensing technologies such as aerial and satellite imaging.

DETAILED DESCRIPTION OF PREFERRED EMBODIMENTS

A primary agrochemical requiring intensive management for numerous crops is N fertilizer. For purposes of illustration, we will describe our method utilizing N fertilizer as the managed agrochemical, however, it will be apparent to those skilled in the art that the principles described for fertilizer application can be applied to other agrochemicals or materials.

Regarding the background science behind crop N status monitoring, it has been shown that the positive relationship between leaf greenness and crop nitrogen (N) status will allow the determination crop N requirements based on reflectance data collected from the crop canopy (Walberg et al., 1982; Girardin et al., 1985; Hinzman et al., 1986; Dwyer et al., 1991) and leaves (McMurtrey et al., 1994). Plants with increased levels of N typically have more chlorophyll (Inada, 1965; Rodolfo and Peregrina, 1962; Al-Abbas et al., 1974; Wolfe et al., 1988) and greater rates of photosynthesis (Sinclair and Horie, 1989). Hence, plants that appear a darker green are perceived to be healthier than N deficient plants. Chlorophyll in leaves absorbs strongly in the blue and red regions of the spectrum (460 nm and 670 nm) and reflects/transmits light in the green region (550 nm). Blackmer et al. (1994a,b,c) used a spectroradiometer to characterize the differences in light reflected from corn canopies receiving different N treatments. They found a strong relationship between green light (550 mm) and fertilizer N rate. In addition, green light reflectance from corn during the late milk stage (R4 to R5) was highly correlated with grain yield ($r^2$=0.98, ten N rates for one hybrid). As a result, it is the relationship between leaf greenness (reflected green light) and chlorophyll content (absorbance) which makes it possible to remotely sense or measure leaf greenness and obtain an indication of chlorophyll concentration and plant N status.

Adoption of automated N management practices will require methodologies that impact their current farming practices minimally. Recently there has been a trend in the United States by growers to apply nitrogen via split application, that is, some of the N is applied at planting time and the remainder is applied during the growing season when the crop is most responsive to nutrient. In other situations, N is applied in multiple doses during the growing season such as in European wheat and barley crops. Here, N in these cropping systems is applied at regular intervals to achieve certain biomass goals. Both split and dosage application farming practices can benefit from the agrochemical management methodology presented herein. Cotton is another crop that will benefit from this method. Both growth regulators and defoliants are applied in-season on cotton crops. With application of growth regulators, the goal is to achieve a uniform biomass throughout a field and use of a real-time sensing system controlled with the application methodology presented here will greatly benefit cotton growers.

In the most general sense, the real-time non-reference strip variable rate application equation can be defined as follows:

$$S_{Rate} = k \cdot (S_{app} + G \cdot f(\alpha)) \quad (1)$$

where $S_{Rate}$ is the desired real-time rate of application for the agrochemical; $S_{App}$ is the producer's conventional application rate for the agrochemical; G is the crop growth rate response constant; $f(\alpha)$ is the general biomass sensitivity function or growth function; k is a zone factor scalar (0<k<2); and $\alpha$ is the normalized biomass sensitivity variable.

The functional form of the real-time equation (1) allows a grower to set a typical in-season application rate for his agrochemical $S_{App}$. This may be a standard side-dress rate or some other split application or dosage rate. Modification of this in-season rate due to crop variability is performed via the sensor-controlled term, $G \cdot f(\alpha)$. Because soil types and field conditions across an agricultural landscape can vary substantially, zone factor k has been included in equation 1 to allow for spatial scaling of the rate equation. For example, consider a corn field. In some soil regions of the field, soil fertility may be very low and no matter how much N is applied, there will not be a commensurate increase in yield. In this situation, the factor k may be assigned a value of 0.25 in order to conserve N in this part of the field. The purpose of the zone factor is to either increase or decrease the overall rate amount to account for landscape variability in the field due to soil types, topology, soil chemistry, drainage, organic matter, and the like. This zone factor is typically utilized when additional geospatial information (for example soil maps, yield maps, biomass maps, soil sample) are incorporated into the variable rate system to account for highly productive or non productive regions of the field. When the VRA system is operated in real-time and not utilizing other geospatial data, the zone factor is ignored by setting by setting its value equal to 1.0. Zone factor k can also be determined in real-time through the use of a soil sensor. This soil sensor can be either a conductivity sensor that is pulled through or over the soil, optical in situ soil sensor or a reflectance sensor such as disclosed in U.S. patent application Ser. No. 10/703,256, which is incorporated herein by reference. Measurements collected by these sensors can be utilized in conjunction with a look-up table or equation to generate values for the zone coefficient k. Furthermore, zone factor k can also be split into zone factors k1 and k2 where k1 modifies only $S_{App}$ and k2 modifies $G \cdot f(\alpha)$. This gives the application rate method additional flexibility in situations when either the grower application rate or the sensor application rate is to be modified or shut down independently with respect to the other.

Additionally, $\alpha$ may be further defined as:

$$\alpha = \frac{VI_{Field} - VI_{Ref}}{VI_{Max} - VI_{Min}} \quad (2)$$

where $VI_{Field}$ is the real-time vegetation index information measured via remote sensing; $VI_{Ref}$ is a statistical measure of the crop canopy which may include maximum, minimum, average, and the like, vegetation index values; $VI_{Max}$ is the maximum value of the vegetation index of the scanned field; and $VI_{Min}$ is the minimum value of the vegetation index of the scanned field.

Figure 2:
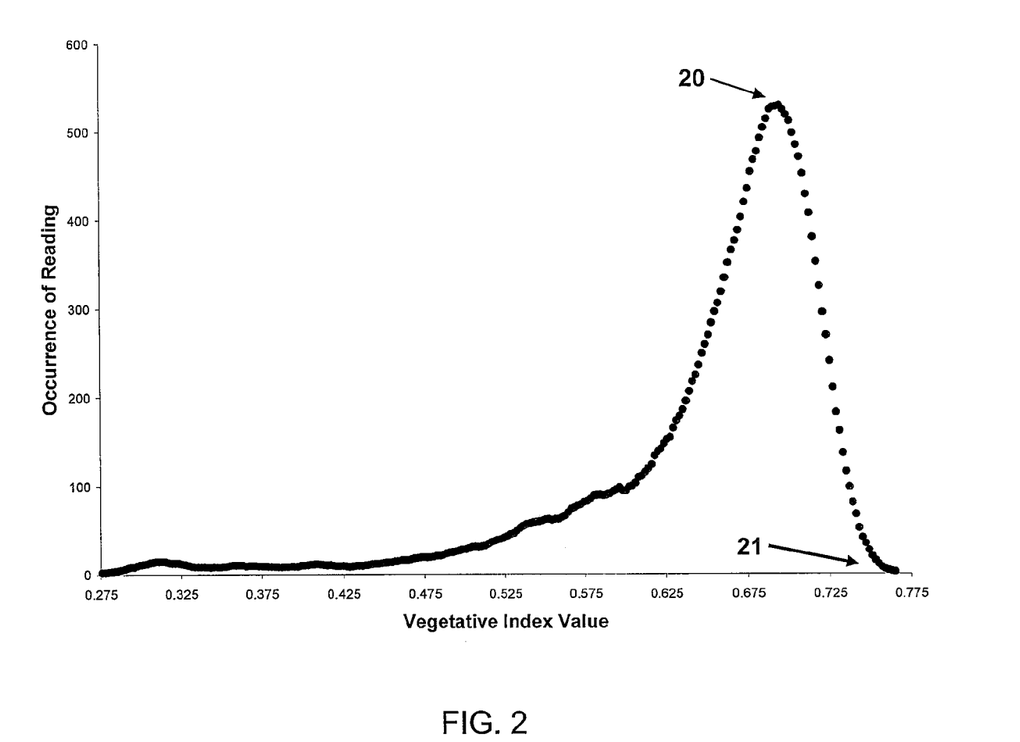
FIG. 2 is a histogram of vegetative index data collected during a scan partial scan of a field crop.

The function variable $\alpha$ is utilized by the method presented in this work to characterize the crop variability and to control the range (bound) of numeric values that the sensed crop data will assume for rate processing. This method essentially reduces the system's sensitivity to absolute sensor calibrations via normalization. The vegetative bounds $VI_{Max}$ and $VI_{Min}$ can be determined by any number of means which may include maximum and minimum detection, histogram acquisition/analysis, etc. . . . Additionally, the $VI_{Ref}$ term may be either $VI_{Avg}$, $VI_{Max}$ or $VI_{Min}$ or some other statistically determined value extracted from remotely sensed field data, for example, an average, a weighted mean, probability distribution, etc. . . . In some circumstances, $VI_{Ref}$ could be predetermined from previously acquired sensor data or set by a variable rate controller's software (hard coded). With regard to determining the statistical vegetative index values for sampled field data, one convenient method would be to analyze the histogram of sampled data. FIG. 2 shows a histogram of data collected from a corn field. The data can be first smoothed using a moving average filter other digital signal processing technique in order to determine the data distribution's maximum value. In some cases, this maximum value can serve as the data set's $VI_{Ref}$ 20. Determinations of $VI_{Max}$ 21 and $VI_{Min}$ can be made by analyzing the smoothed data set for values that are 10 to 15% of the peak value or any other arbitrary or predetermined percentage. Furthermore, the maximum and minimum bounds may be determined by first determining $VI_{Max}$ using a predetermined percentage of the peak value and then determining the minimum using the following relationship:

$$VI_{Min} = VI_{Ref} - (VI_{Max} - VI_{Ref}) \quad (3)$$

The boundary determination technique in equation 3 will result in maximum and minimum values for equation 2 that are equidistance from $VI_{Ref}$. Additionally, a more basic form of $\alpha$ may be determined in the equation below:

$$\alpha = \frac{VU_{Field}}{b \cdot VI_{Ref}} \quad (4)$$

where $VI_{Field}$ is the real-time vegetation index information measured via remote sensing; $VI_{Ref}$ is a statistical measure of the crop canopy which may include maximum, minimum, average, and the like, vegetation index values; and b is a scalar (0<b<2).

The simplified form of $\alpha$ in equation 4 is simply the ratio of a measured portion of the field to a sampled portion of the field (b=1). Values for $\alpha$ will pivot around unity. Low biomass values will span from 0 to unity and high biomass ratios will have values exceeding unit. Also note, the ratio in 4 can easily be reciprocated, as well as any form of $\alpha$ previously described, and similar equal or similar results obtained without deviation from the intent of the methodology disclosed. $VI_{Ref}$ can also be defined to produce what could be referred to as a "pseudo reference strip". The scaled magnitude of $VI_{Ref}$ is similar to the $VI_{Ref}$ value that what one would obtain from the ideal reference strip concept. Here the statistical value of $VI_{Ref}$ would be scaled via scalar b to set the artificial reference value, for example, if b were set to a value of 1.25 and $VI_{Ref}$ represented the field average for a given vegetative index, the reference value would be 25% greater than the field average. This value would then be utilized by agrochemical application algorithm to establish the maximum biomass value for field operations. It will be readily apparent to one skilled in the art, that this scaling technique and other scaling methods can be utilized to artificially set field reference values independently of an actual producer-created reference strip in an agricultural landscape.

Figure 3:
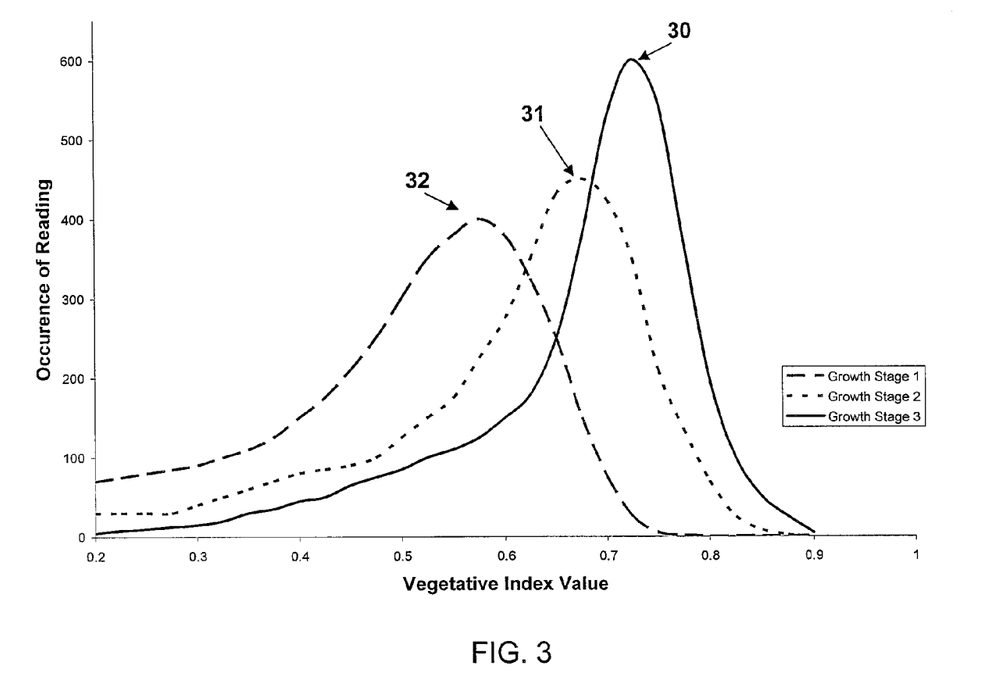
FIG. 3 is a chart of three histograms for field crop collected at three different growth stages.

Furthermore, growth function $f(\alpha)$ may be defined to provide the applicator system with a customized response to changing vegetation biomass or crop stress. The function may be tailored so as to model the growth behavior of the plant in general or at a specific time in its growth cycle. For example, $f(\alpha)$ may simply be the variable $\alpha$ times a scale constant G, a piecewise continuous (or discontinuous) function, a look up table, or other curvilinear function (polynomial, sigmoid, etc. . . . In the case of a scale constant G, the variable $\alpha$ is related to an agrochemical rate proportional to changes in crop biomass. Additionally, the sampled average vegetative index value (assigned to $VI_{Ref}$) can be utilized by the system to automatically determine the nature or shape of $f(\alpha)$. FIG. 3 shows three histograms taking at different stages of crop growth. The peak occurrences for each of the three curves can be utilized as pointers in a table to select the appropriate growth function, $f(\alpha)$, see Table 1 below. Since the crop will accumulate biomass as it grows and this in turn is indicative of the crop growth stage, the system can use this sampled vegetative index value (or peak occurrence) to estimate the age of the crop and select the appropriate growth related equation from a table of functions. Or, $f(\alpha)$ can be derived to respond to this parameter so as to compensate for the changing physiological needs of the plant due to it growth status. By automatically determining the appropriate growth model, the requirement of the operator to enter data regarding growth stage of the crop is eliminated and embeds this information in the variable rate control system subsequently simplifying use of the system by the operator. It will be readily apparent to one skilled in the art, that there are other analysis techniques that can be utilized to automatically classify data in order to select the growth function, $f(\alpha)$, based on sampled crop data including peak occurrence amplitude detection, centroid analysis, first derivative analysis, etc. . . .

TABLE 1

Example look up table for selecting crop growth stage based on average biomass readings.

| Mean Crop NDVI | Crop Growth Stage Model |
|---|---|
| 0 < AVG NDVI < 0.60 | $f_1(\alpha)$ |
| 0.60 < AVG NDVI < 0.70 | $f_2(\alpha)$ |
| AVG NDVI > 0.70 | $f_3(\alpha)$ |

Another variation of $\alpha$ relates to the plants physiological response to an agrochemical with respect to a change in a vegetative index. This form of $\alpha$ is defined as:

$$\alpha = \frac{\partial W}{\partial VI} \cdot [VI_{Field} - VI_{Ref}] \quad (5)$$

where $\pm \delta W/\delta VI$ is the change in the plants growth response with respect to a change in vegetative index VI, $VI_{Field}$ is the real-time vegetation index information measured via remote sensing, and $VI_{Ref}$ is a statistical measure of the crop canopy which may include maximum, minimum, average, and the like, vegetation index values.

The variable $\alpha$ in equation (5) may be multiplied by a scalar G which relates the amount of agrochemical to apply per accumulated biomass. The differential in equation (5) can easily be scaled to yield other physiological growth changes per unit vegetative index value. It should also be stated that the vegetative index in equations (2) and (5) is preferably a vegetative index that has good linearity over the range of biomasses or plant stresses that are being monitored. Vegetative indices that are usable include, but not limited too, normalized difference vegetative index (NDVI), (simple ratio index) SRI, chlorophyll index, and the like. Additionally, as will be apparent to one skilled in the art, the function $\alpha$ may be derived to have other functional forms which will result in similar normalized mathematical behavior as equations (2) and (5).

EXAMPLES OF USE

The following three examples demonstrate how the algorithm can be utilized in typical agricultural VRA operations. As will be apparent to one skilled in the art, the following examples are not exhaustive in extent, but rather, show some typical applications of the sensor-based management method disclosed. There numerous other modifications and implementations which that are possible while remaining within the scope of the methodology disclosed.

Example 1

Figure 4:
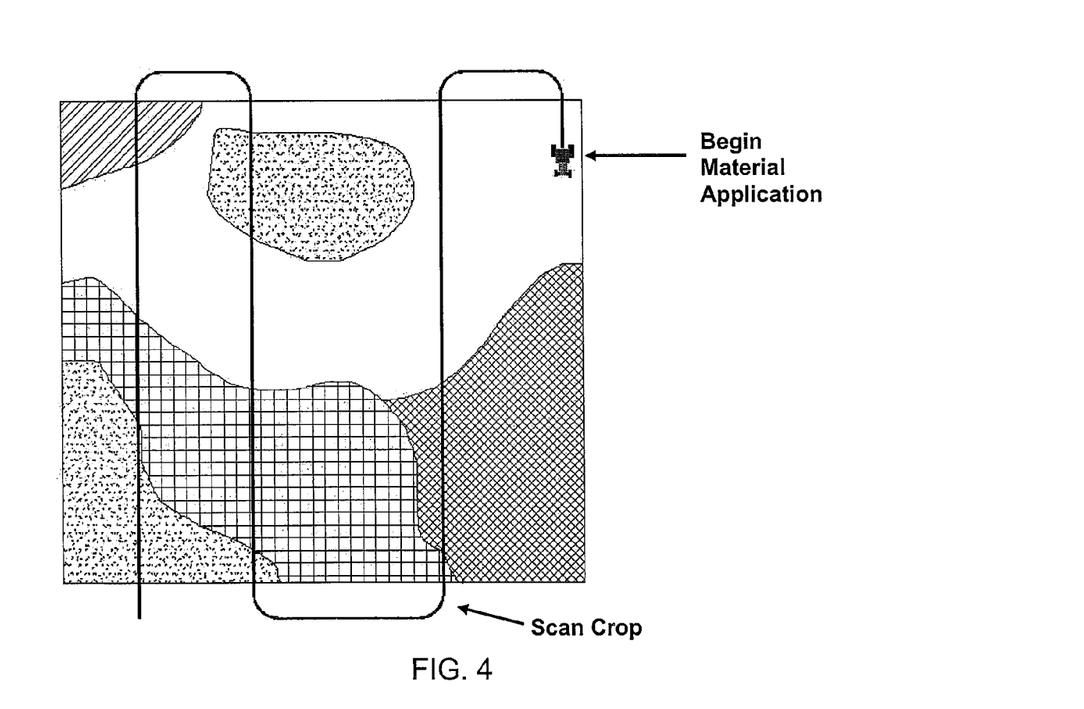
FIG. 4 is a chart of sensor-based variable rate application utilizing random field sampling for sensor calibration.

A grower decides to variably apply nitrogen to a field. He decides to apply 100 kg/ha on average and that his maximum and minimum rates should be 50 and 150 kg/ha, respectively. These parameters are loaded into the variable rate controller located inside his tractor. Next, the grower drives several transect through his field to collect crop growth information, see FIG. 4. Note, the coefficients in equation (1) become: $S_{App}$ equal 100 kg/ha, G equal 50 kg/ha, k equal 1.0 and for simplicity function $f(\alpha)$ is the function argument $\alpha$, equation (2), (normally $f(\alpha)$ would be a curvilinear function that would characterize the growth behavior of the crop). The parameters for the variable $\alpha$ are determined via the transects through the field and will be bounded so as to produce a range of values between −0.5 and 0.5 around the field average. Equation (1) is now has the following form:

$$S_{Rate} = 100 + 50 \cdot \alpha \quad (6)$$

He then proceeds to drive the field and apply nitrogen to his crop. At the sensing extremes, the applicator system will apply 150 kg/ha to the low biomass portions of the field and 50 kg to the high biomass portions of the field.

Example 2

Figure 5:
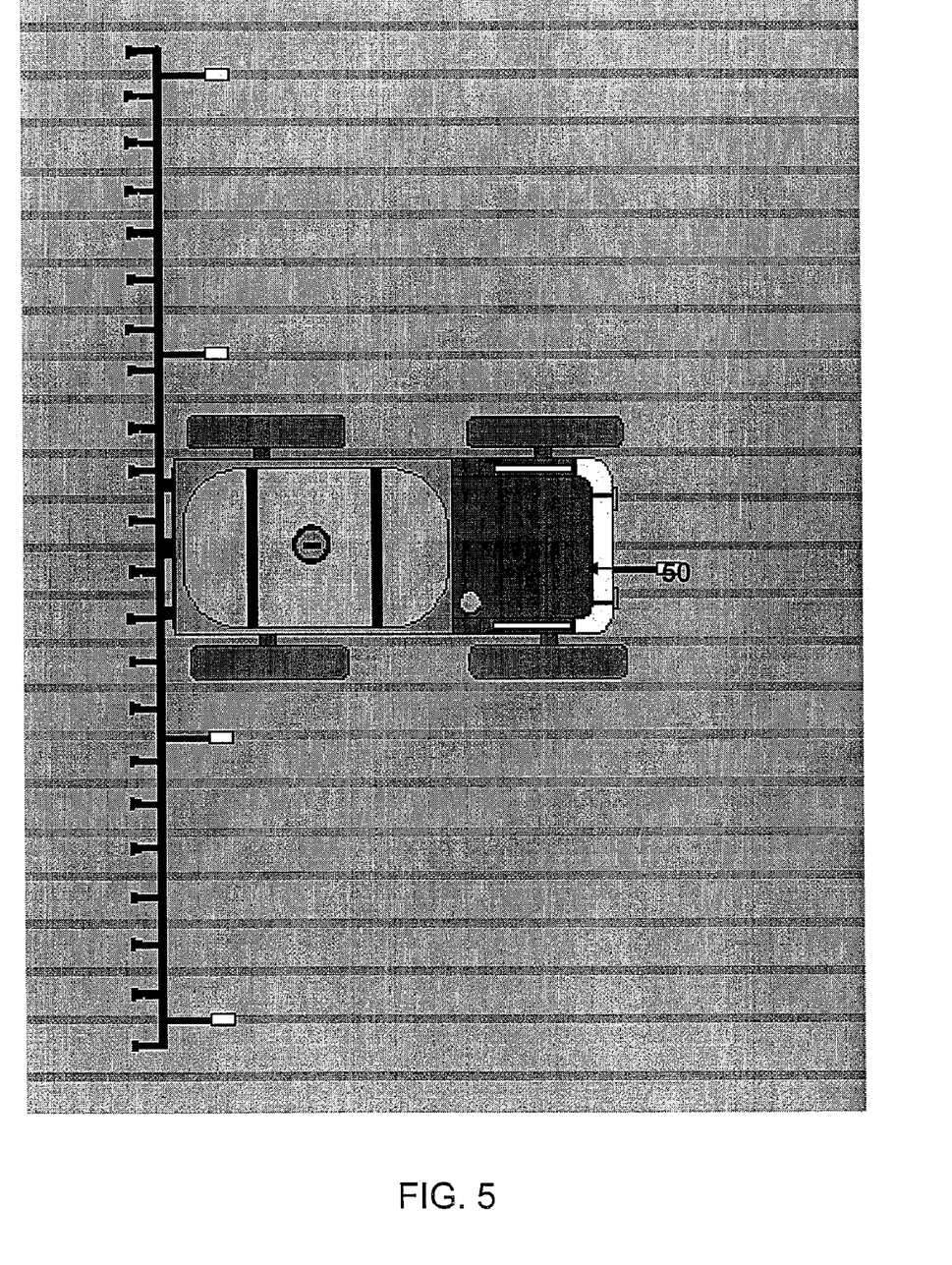
FIG. 5 is a diagrammatic view of a variable-rate applicator system with real-time crop sensors and real-time soil color sensor.
Figure 6:
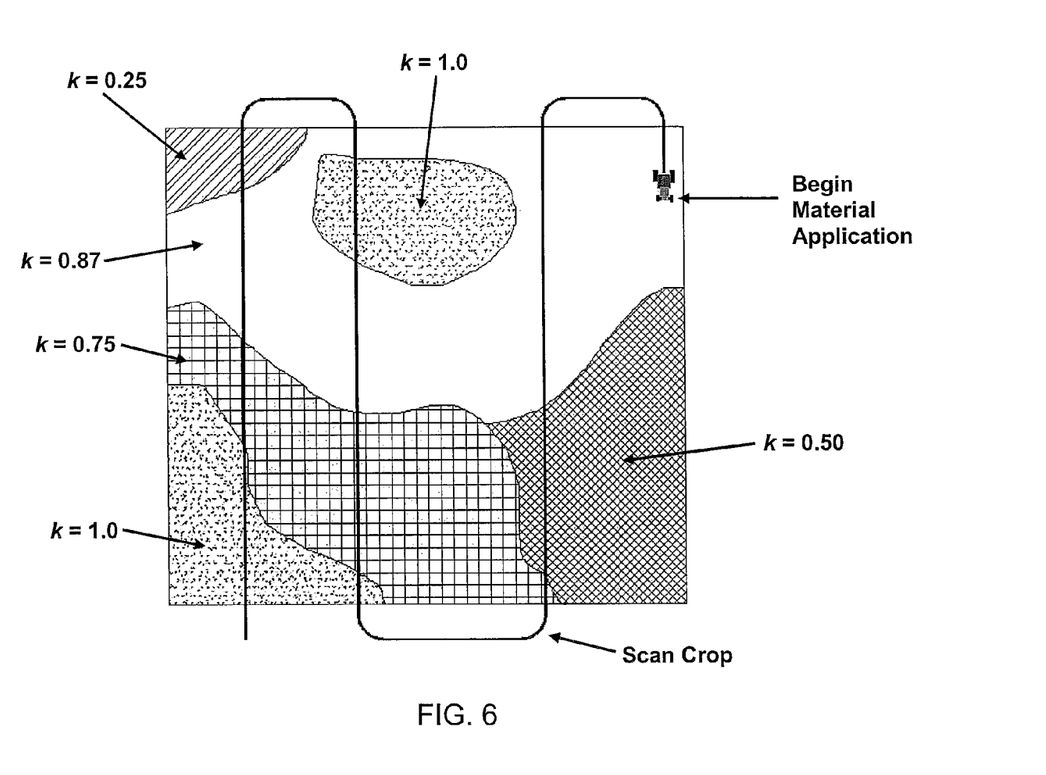
FIG. 6 is a chart of sensor-based variable rate application utilizing random field sampling for sensor calibration and zone factor scaling.

Now consider the previous example but this time allowance for real-time zone factor adjustment of the application rate is performed with the use of a soil sensor 50 in FIG. 5. The VRA system is driven through the as was done in example 1 above in order to collect crop biomass information, see FIG. 6. After the crop data has been collected, VRA system changes to the application mode to apply material to the crop. Material application is now based on both crop sensor readings and soil sensor readings. In this example the soil sensor 50 is a reflectance sensor that produces an NDVI output that is proportional to soil color. The output of the soil sensor is fed into a look up table that will be used to generate values for the zone factor k. A typical look-up table may take on the form as shown in Table 2.

TABLE 2

Real-time zone factor look-up table based on soil NDVI measurements.

| Soil NDVI | Zone Factor, k |
| --- | --- |
| 0 < NDVI < 0.3 | 1.0 |
| 0.3 < NDVI < 0.35 | 0.87 |
| 0.35 < NDVI < 0.385 | 0.75 |
| 0.385 < NDVI < 0.41 | 0.5 |
| NDVI > 0.41 | 0.25 |

A similar table can be created for a pull-type, soil conductivity sensor or electromagnetic conductivity sensor. Also, the zone factors can be created from an existing NIR soil color photograph, yield map, etc. . . . and preprocessed using a personal computer. Preprocessed zone maps containing the zone factors can be loaded into the growers variable rate controller mounted in the tractor. This zone factor map will then be used in conjunction with the sensors, applicator controller and GPS when applying fertilizer. The new fertilizer application rate equation has the form:

$$S_{Rate} = k \cdot (100 + 100 \cdot \alpha) \qquad (7)$$

where k is now incorporated in the rate equation to adjust for varying soil or field conditions.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

What is claimed is:

1. A method for calibrating a system for treating plants growing in a geographical area, comprising the steps of:
   (a) passing an optical sensor over a part of the geographical area;
   (b) measuring with the sensor a plant growth parameter at a plurality of locations within the geographical area; and
   (c) analyzing the growth parameter measurements to generate a normalized response function for the geographical area.

2. The method of claim 1, wherein the sensor is a real-time sensor.

3. The method of claim 1, wherein the sensor is carried on an agricultural implement.

4. The method of claim 3, wherein the agricultural implement comprises an applicator for applying an agricultural treatment to the plants.

5. The method of claim 4, wherein operation of the applicator is controlled in response to the normalized response function.

6. The method of claim 1, wherein the sensor is flown over the geographical area.

7. The method of claim 6, wherein the sensor is carried on an airplane.

8. The method of claim 6, wherein the sensor is carried on a satellite.

9. A method for applying a controlled amount of an agricultural product to a crop growing in a field, comprising the steps of:
   (a) passing an optical sensor over a part of the field;
   (b) measuring with the sensor a crop growth parameter at a plurality of locations within the field;
   (c) analyzing the growth parameter measurements to generate a normalized response function for the field;
   (d) mounting an optical sensor on an applicator for the agricultural product for transport across the field to sense the crop growth parameter at a location in the field; and
   (e) applying the agricultural product on the crop at the location in the field in an amount that is adjusted in response to the crop growth parameter for the location as compared to the normalized response function.

* * * * *